United States Patent [19]
Ivie, Sr.

[11] 4,140,177
[45] Feb. 20, 1979

[54] PROTECTIVE GRID AND STRUCTURAL SUPPORT FOR A RADIATOR

[75] Inventor: Gordon W. Ivie, Sr., Peoria, Ill.

[73] Assignee: Caterpillar Tractor Co., Peoria, Ill.

[21] Appl. No.: 815,382

[22] Filed: Jul. 13, 1977

[51] Int. Cl.² .............................................. F28F 9/26
[52] U.S. Cl. ........................... 165/134 R; 165/149; 180/68 P
[58] Field of Search ............ 180/68 P; 165/134, 119, 165/149, 76, 78; 123/41.48, 41.49

[56] References Cited

U.S. PATENT DOCUMENTS

| | | | |
|---|---|---|---|
| 1,209,486 | 12/1916 | Petticord | 165/134 |
| 1,389,749 | 9/1921 | Froberg | 165/134 |
| 1,496,661 | 6/1924 | Dreier | 180/68 P |
| 1,571,354 | 2/1926 | Whitacre | 180/68 P |
| 1,601,226 | 9/1926 | Smith | 165/76 |
| 2,132,483 | 10/1938 | Klespe | 180/68 P |
| 2,325,913 | 8/1943 | McLemore, Jr. | 165/134 |
| 2,796,141 | 6/1957 | Schreiner | 180/68 P |
| 2,932,489 | 4/1960 | Young | 165/149 |
| 2,966,339 | 12/1960 | Morgan | 123/41.48 |
| 3,165,151 | 1/1965 | Astrup et al. | 165/149 |
| 3,275,072 | 9/1966 | Suchomel | 165/134 |
| 3,385,355 | 5/1968 | Spaulding | 165/134 |
| 3,446,276 | 5/1969 | Poehlman | 165/119 |
| 3,581,814 | 6/1971 | Jackson | 165/134 |
| 3,776,301 | 12/1973 | Young | 165/76 |

*Primary Examiner*—Charles J. Myhre
*Assistant Examiner*—Sheldon Richter
*Attorney, Agent, or Firm*—Phillips, Moore, Weissenberger, Lempio & Majestic

[57] ABSTRACT

A protective grid and structural support for a radiator having opposed tanks and a recessed core includes a grid assembly configured to be disposed within a recess. The grid assembly has a continuous substantially rigid frame and a plurality of outwardly accessible corner mountings rigidly securing the grid assembly to the radiator to minimize distortion and relative movement between the radiator components.

10 Claims, 3 Drawing Figures

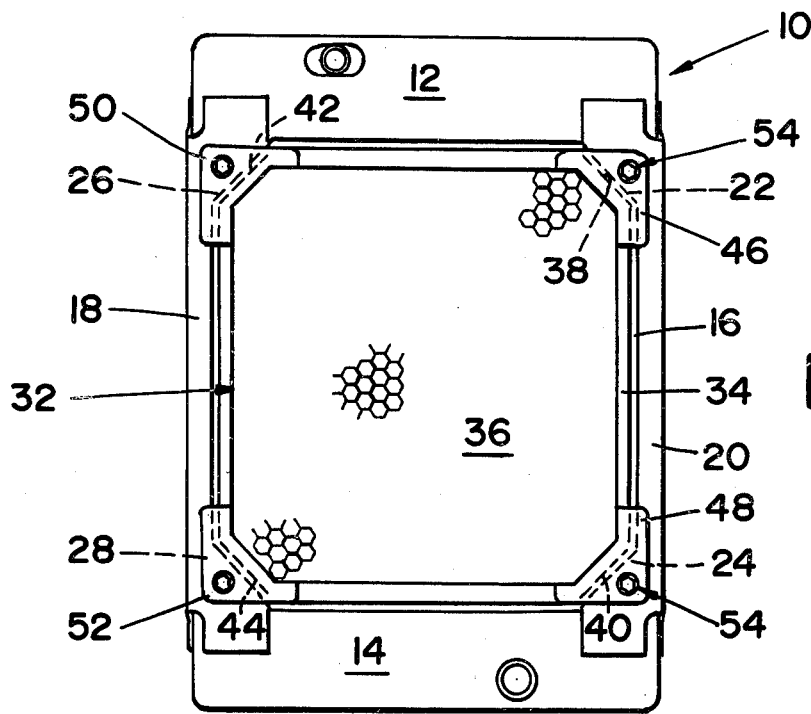
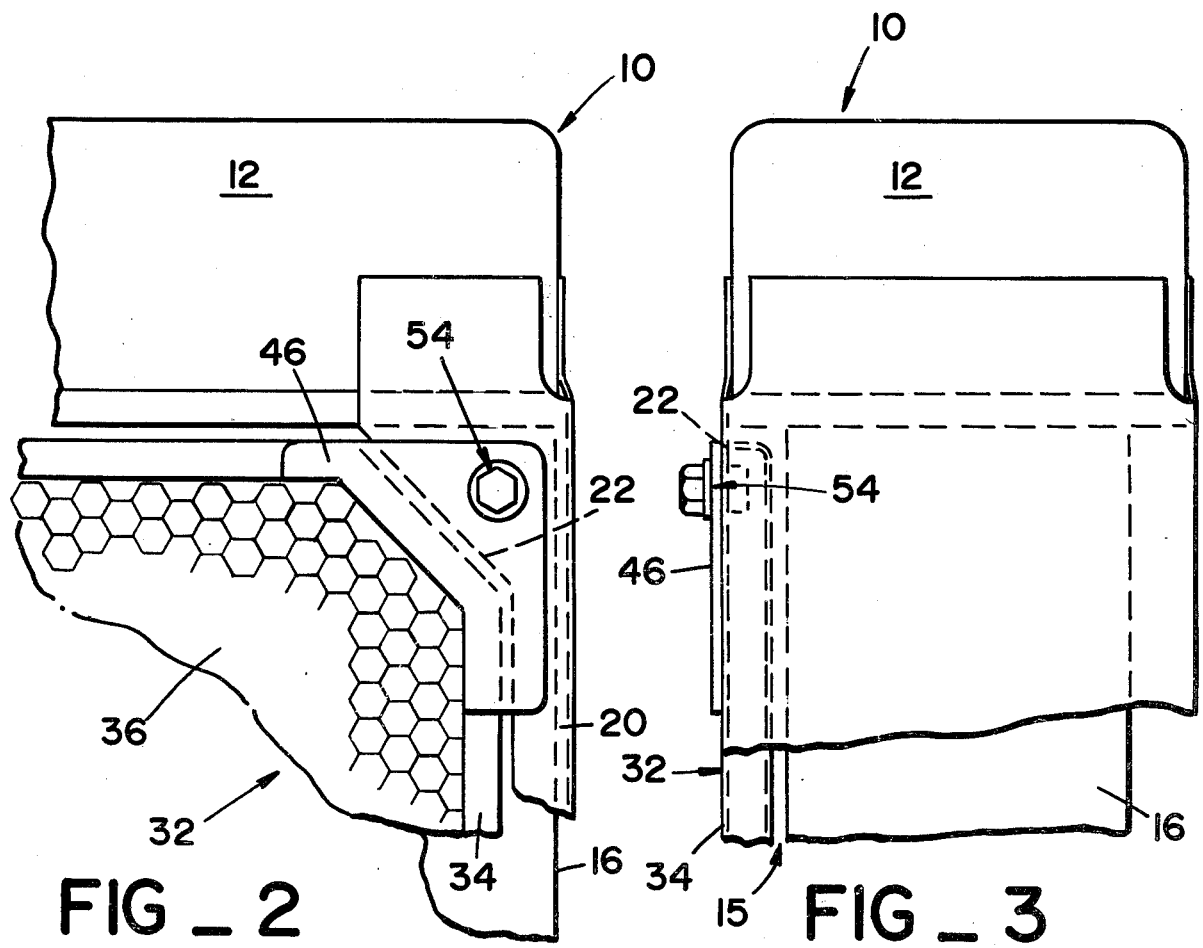

PROTECTIVE GRID AND STRUCTURAL SUPPORT FOR A RADIATOR

BACKGROUND OF THE INVENTION

This invention relates to a protective grid and structural support radiator, and more particularly, to a sandblast grid which may be fitted to the radiator of a vehicle to protect the core thereof, and to enhance the structural integrity of the radiator.

In general, radiator cores which include spaced liquid coolant tubes and interconnecting spaced fins are used in vehicles employing internal combustion engines. When such vehicles are in use, sand and other solid particles may enter the airstream of the core area, so that the tubes and fins may be abraded and worn away.

In general, it is well known to provide a protector in the form of a grid for a vehicle radiator or heat exchanger, which is positioned so that the force of such airborne particles or the like is absorbed or deflected primarily by the grid before reaching the fins of the core.

In general, such a grid is positioned at the air inlet side of the radiator core, with a relatively large gap between such grid and the radiator core, which permits an infinitesimal volume of abrasive particles to pass undisturbed through the gap and into the radiator core. A further problem encountered with such conventional structures is the occurance of frequent fatigue failure of the radiator components due to relative movement therebetween caused by twisting of the vehicle frame as it traverses rough and undulating terrain. It will be understood that it is highly desirable to provide an overall compact structure including the grid and radiator, with the advantage that the grid may be easily fitted to the radiator and add to the overall rigidity of the structure.

SUMMARY OF THE INVENTION

The present invention is directed to overcoming one or more of the problems as set forth above.

Broadly stated, the invention relates to a protective grid and structural support for a radiator having core means and upper and lower tanks secured relative thereto, wherein core means are recessed relative to the upper and lower tanks. The grid assembly is configured to extend in the recess area of the core relative to the tanks.

BRIEF DESCRIPTION OF THE DRAWINGS

Other objects of the invention will become apparent from a study of the following specification and drawings, in which:

FIG. 1 is a front elevation of the present grid assembly secured to a radiator;

FIG. 2 is an enlarged view of a portion of the assembly of FIG. 1; and

FIG. 3 is a side view of the assembly of FIG. 2.

DESCRIPTION OF THE PREFERRED EMBODIMENT

Shown in FIG. 1 is a radiator 10 including upper and lower tanks 12 and 14, respectively, and a conventional core 16 interconnecting the upper and lower tanks with the core including tubes and fins as is well known. As best shown in FIG. 3, the width of the tanks is greater than the width of the core so that the tanks overhang the core to provide a recess 15 adjacent to the face of the core. Side brace members 18, 20 interconnect the upper and lower tanks 12, 14 for providing an overall relatively rigid structure. As shown in FIG. 2, the side brace members 18, 20 define respective angled corner plates 22, 24, 26, 28.

Fitted to the radiator is a grid assembly 32 having a continuous outer frame 34 in which is mounted a grid member 36 of a honeycomb configuration. The grid member 36 is secured to the frame 34 and is of overall generally rectangular configuration, with angled corners 38, 40, 42, 44 defined thereby. The frame 34 is continuous so as to define the outer periphery of the grid assembly 32. With this structure, it will be seen that the overall grid assembly 32 has a high degree of rigidity.

The frame 34 has mounted thereto at the corners thereof brackets 46, 48, 50, 52, each being secured to a corner of the frame along the front surface thereof. Each corner bracket is secured to a respective angled corner plate 22, 24, 26, 28 by means of nut and bolt assemblies 54 disposed therethrough. With the grid assembly 32 so mounted, it will be seen that the grid assembly 32 is secured to the radiator 10, with the grid member 36 disposed within the recess 15 adjacent to the core 16 and between the upper and lower tanks 12, 14. This is so because of the particular placement of the frame 34, corner brackets 46, 48, 50, and angled corners 38, 40, 42, 44 of the brace members 18, 20 taking advantage of the space provided by the recess 15. Thus, this recess is not wasted, as has been the case previously, but rather the grid assembly 32 and structure associated therewith is particularly advantageously configured to use such space to provide an overall extremely compact structure, maintaining highly efficient operation of the apparatus. Because of the particular construction set forth above, the grid assembly 32 adds to the overall strength and rigidity of the combined structure of the radiator 10 and the grid assembly 32, minimizing distortion and relative movement between the individual radiator and said components.

The embodiments of the invention in which an exclusive property of privilege is claimed are defined as follows:

1. A protective grid and structural support in combination with a radiator having a core and lateral sides and spaced upper and lower tanks secured thereto in overhanging relation therewith to provide a recess between the tanks adjacent to the core, said support comprising a grid assembly disposed within the recess in protective masking relation to the core and secured in structurally supporting relation to the tanks and the core and a brace member disposed on each lateral side of said radiator and secured between said upper and lower tanks, said grid assembly secured directly to each said brace member.

2. The apparatus of claim 1 wherein the grid assembly comprises a frame, and a grid member secured within the frame, said frame secured to each said brace member.

3. The apparatus of claim 2 wherein the frame comprises a continuous one piece frame defining the outer periphery of the grid assembly.

4. The apparatus of claim 3 wherein the frame is generally rectangular.

5. The apparatus of claim 2 including means for mounting the grid assembly to the radiator comprising bracket means secured to the frame and detachably secured directly to each said brace member.

6. The apparatus of claim 4 including means for mounting the grid assembly to the radiator comprising bracket means secured to the frame and detachably secured directly to each said brace member.

7. The apparatus of claim 6 wherein the bracket means comprise corner brackets individually secured to the corners of the generally rectangular frame.

8. The apparatus of claim 7 wherein each said brace member has a pair of plates secured thereon with each plate being secured to a respective one of said tanks and further secured to a respective one of said corner brackets.

9. The apparatus of claim 8 and fastening means for releasably securing each bracket to a plate.

10. A protective grid and structural support in combination with a radiator having a core and spaced upper and lower tanks secured thereto in overhanging relation therewith to provide a recess between the tanks adjacent to the core, said support comprising a grid assembly disposed within the recess in protective masking relation to the core and secured in structurally supporting relation to the tanks and the core, said grid assembly comprising a generally rectangular one piece frame having a grid member secured therein, a pair of plates secured to each of said tanks, and a bracket secured to each corner of said frame and further secured to a respective one of said plates.

* * * * *